(12) United States Patent
Cherkasova

(10) Patent No.: US 7,200,598 B2
(45) Date of Patent: Apr. 3, 2007

(54) SYSTEM AND METHOD FOR EFFICIENTLY REPLICATING A FILE AMONG A PLURALITY OF RECIPIENTS HAVING IMPROVED SCALABILITY

(75) Inventor: Ludmila Cherkasova, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 618 days.

(21) Appl. No.: 10/345,718

(22) Filed: Jan. 16, 2003

(65) Prior Publication Data

US 2004/0143576 A1 Jul. 22, 2004

(51) Int. Cl.
  *G06F 7/00* (2006.01)
  *G06F 17/30* (2006.01)
  *G06F 12/00* (2006.01)
  *G06F 15/173* (2006.01)

(52) U.S. Cl. .................. 707/10; 707/204; 709/226
(58) Field of Classification Search ................ 707/10, 707/101, 104.1, 204; 709/222, 226, 219, 709/236, 235; 711/173
See application file for complete search history.

(56) References Cited

U.S. PATENT DOCUMENTS

| | | | |
|---|---|---|---|
| 5,832,522 A * | 11/1998 | Blickenstaff et al. | ....... 707/204 |
| 5,835,757 A * | 11/1998 | Oulid-Aissa et al. | ......... 707/10 |
| 5,963,944 A | 10/1999 | Adams | |
| 6,205,445 B1 | 3/2001 | Tokuyama | |
| 6,230,251 B1 | 5/2001 | Batten et al. | |
| 6,233,252 B1 | 5/2001 | Barker et al. | |
| 6,269,080 B1 | 7/2001 | Kumar | |
| 6,397,251 B1 | 5/2002 | Graf | |
| 6,405,219 B2 | 6/2002 | Saether et al. | |
| 6,449,688 B1 | 9/2002 | Peters et al. | |
| 6,477,583 B1 | 11/2002 | Zayas et al. | |
| 6,493,877 B1 | 12/2002 | Yamazaki et al. | |
| 6,772,337 B1 * | 8/2004 | Yener | .......................... 713/165 |
| 6,857,012 B2 * | 2/2005 | Sim et al. | .................... 709/222 |
| 6,865,601 B1 * | 3/2005 | Cherkasova et al. | ........ 709/220 |
| 6,925,499 B1 * | 8/2005 | Chen et al. | .................. 709/226 |

(Continued)

OTHER PUBLICATIONS

Shamkant Navathe, Stefano Ceri, Gio Wiederhold, and Jinglie Dou (1984), Veritcal Partitioning Algorithms for Database Design, pp. 680-710.*

Haifeng Yu and Amin Vahdat (2002), Minimal Replication Cost for Availability, pp. 98-107.*

(Continued)

*Primary Examiner*—Alford Kindred
*Assistant Examiner*—Merilyn Nguyen
(74) *Attorney, Agent, or Firm*—Richard P. Lange

(57) ABSTRACT

A method of distributing a file from a first node to a plurality of recipient nodes comprises logically organizing a plurality of recipient nodes to which a file is to be distributed into a plurality of groups of recipient nodes. The file is distributed to the plurality of groups, wherein the distributing includes (a) partitioning the file into a plurality of subfiles, (b) distributing the plurality of subfiles from a first node to a first group, wherein at least one subfile is distributed from the first node to each recipient node of the first group but not all of the plurality of subfiles are distributed from the first node to any of the recipient nodes of the first group, and (c) the plurality of recipient nodes of the first group exchanging their respective subfiles such that each recipient node of the first group obtains all of the plurality of subfiles.

40 Claims, 7 Drawing Sheets

U.S. PATENT DOCUMENTS

| | | | | |
|---|---|---|---|---|
| 6,970,939 B2* | 11/2005 | Sim | .......................... | 709/236 |
| 7,080,400 B1* | 7/2006 | Navar | ....................... | 725/139 |
| 2002/0083118 A1 | 6/2002 | Sim | | |
| 2002/0083187 A1 | 6/2002 | Sim et al. | | |
| 2004/0088380 A1* | 5/2004 | Chung et al. | ............... | 709/219 |

OTHER PUBLICATIONS

Ludmila Cherkasova, Mohan DeSouza, Shankar Ponnekanti, Improving Performance of Shared Web Hosting Service on a Web Server Cluster.*

Ludmila Cherkasova and Jangwon Lee (2003), FastReplica: Efficient Large File Distribution within Content Delivery Networks.*

Domenico Sacca and Gio Wiederhold (1985), Database Partitioning in a Cluster of Processors, pp. 29-56.*

Byers, J. et al., "Informed Content Delivery Across Adaptive Overlay Networks," Proc. of ACM SIGCOMM, 2002, pp. 1-14.

U.S. Appl. No. 10/345,716, Cherkasova.

U.S. Appl. No. 10/345,719, Cherkasova.

U.S. Appl. No. 10/345,587, Cherkasova.

* cited by examiner

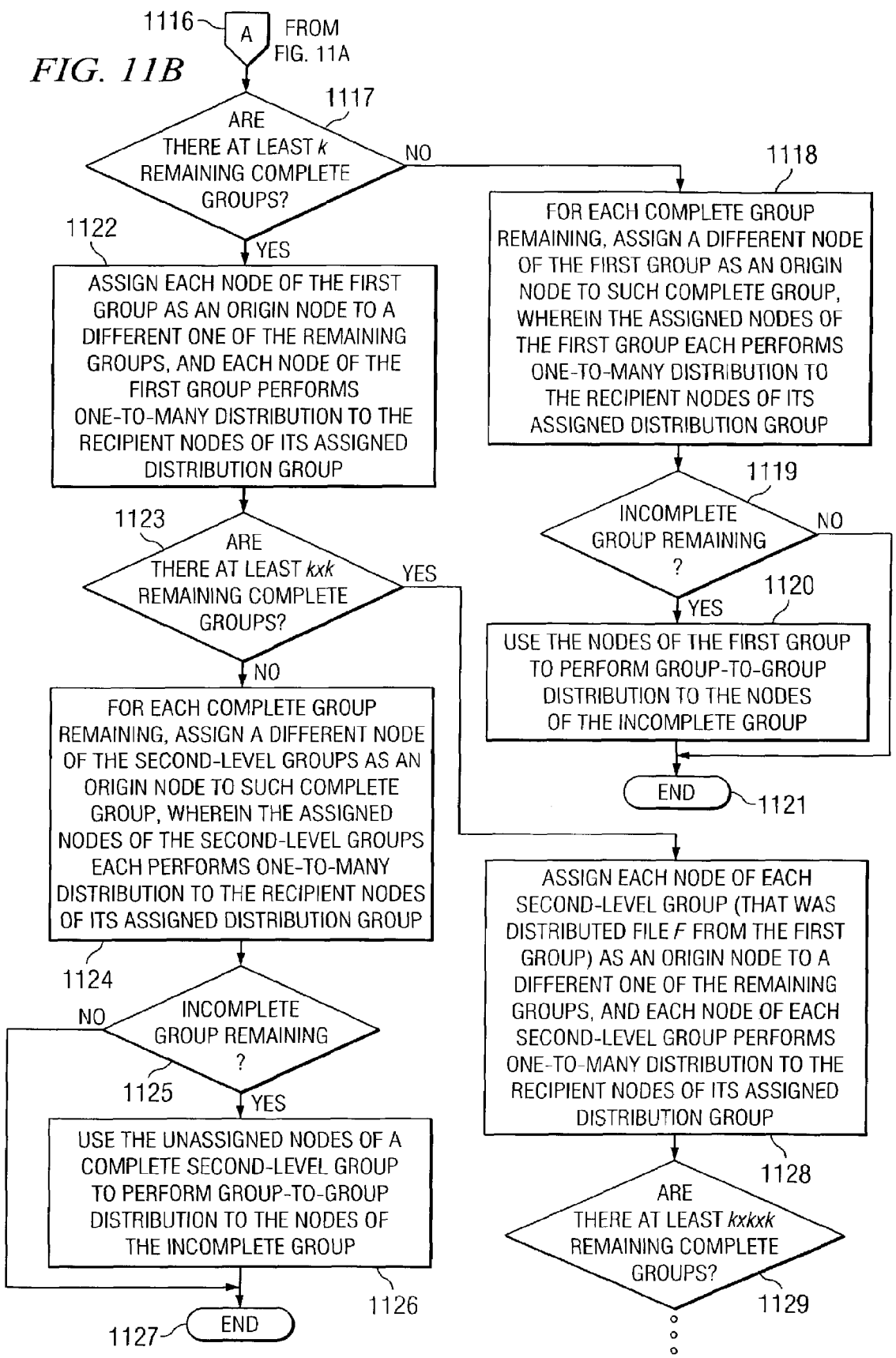

SYSTEM AND METHOD FOR EFFICIENTLY REPLICATING A FILE AMONG A PLURALITY OF RECIPIENTS HAVING IMPROVED SCALABILITY

CROSS-REFERENCE TO RELATED APPLICATIONS

This application is related to U.S. Published Patent Application Number 2004-014375 titled "SYSTEM AND METHOD FOR EFFICIENTLY REPLICATING A FILE AMONG A PLURALITY OF RECIPIENTS", U.S. Published Patent Application Number 2004-0143647 titled "SYSTEM AND METHOD FOR EFFICIENTLY REPLICATING A FILE AMONG A PLURALITY OF RECIPIENTS IN A RELIABLE MANNER", and U.S. Published Patent Application Number 2004-0143595 titled "SYSTEM AND METHOD FOR EFFICIENTLY REPLICATING A FILE AMONG A PLURALITY OF RECIPIENTS HAVING IMPROVED SCALABILITY AND RELIABILITY", the disclosures of which are hereby incorporated herein by reference.

1. Field of the Invention

The present invention relates in general to file distribution, and more specifically to scalable systems and methods for efficiently distributing a large file from a first node to a plurality of recipient nodes.

2. Description of Related Art

Today, much information is stored as digital data. Such information is often available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an ever-increasing amount of information available to users via client-server networks.

It is often desirable to communicate information to a plurality of different recipients. More particularly, it is often desirable to replicate a large file among a number of distributed computers. For instance, in some situations it is desirable for a plurality of distributed clients to receive a replicated file. For example, suppose a number of client computers comprise a software application program, and the application program's provider makes a modification or update to the program. The application provider may desire to distribute the software update to each of the client computers. As another example, a company may receive a new software program and desire to distribute the software program to all of its computers that are communicatively coupled to the company's Local Area Network (LAN) or Intranet.

As still another example, it may be desirable for a large file to be replicated among a plurality of distributed servers. For instance, as described further below, a plurality of distributed servers may be established for efficiently serving content to clients (e.g., each server may be responsible for a particular geographical region of clients), and it may be desirable to replicate a file from an originating server to the other distributed servers such that all of the servers provide the same content to their respective clients. For example, Content Delivery Networks (CDNs) are based on a large-scale distributed network of servers located closer to the edges of the Internet for efficient delivery of digital content, including various forms of multimedia content. The main goal of the CDN's architecture is to minimize the network impact in the critical path of content delivery as well as to overcome a server overload, which is a serious threat for busy sites serving popular content. CDNs implementing distributed content servers are becoming increasingly popular on the Internet, and particularly within the World Wide Web (the "web") portion of the Internet, for example, for serving content (web documents) to clients. Many edge servers may be implemented within the Internet (e.g., hundreds, thousands, or even hundreds of thousands of edge servers may be implemented) that are each to serve the same, replicated content to their respective clients.

For many web documents (e.g., html pages and images having a relatively small file size) served via CDN, active replication of the original content at the edge servers may not be needed. The CDN's edge servers act as caching servers, and if the requested content is not yet in the cache at the time it is requested by a client, the content is retrieved from the original server using the so-called pull model. The performance penalty associated with the initial document retrieval from the original server to the edge server serving the requesting client, such as higher latency observed by the client and the additional load experienced by the original server, is generally not significant for small to medium size web documents.

For large files (e.g., large documents, software download packages, and media files), a different operational mode is typically preferred. In this case, it is typically desirable to replicate these files at edge servers in advance of a client requesting them, using the so-called push model. For large files, actively replicating the files to a plurality of distributed edge servers is a challenging, resource-intensive problem, e.g., media files can require significant bandwidth and download time due to their large sizes: a 20 minute media file encoded at 1 Mbit/s results in a file of 150 Mbytes. If such a large file was not actively replicated to the edge servers in advance of a client requesting the file, a significant performance penalty may be incurred for retrieving the file from the original server, such as higher latency observed by the client and the additional load experienced by the original server in providing the large file to the edge server serving the requesting client. Sites supported for efficiency reasons by multiple mirror servers face a similar problem: the original content needs to be replicated across the multiple, geographically distributed, mirror servers.

BRIEF SUMMARY OF THE INVENTION

In accordance with one embodiment of the present invention, a method of distributing a file F from a first node to a plurality of recipient nodes is provided. The method comprises logically organizing a plurality of recipient nodes to which a file F is to be distributed into a plurality of groups of recipient nodes, wherein each group comprises a plurality of the recipient nodes. The method further comprises distributing the file F to the recipient nodes of the plurality of groups, wherein the distributing includes (a) partitioning the file F into a plurality of subfiles, (b) distributing the plurality of subfiles from a first node to a first group of recipient nodes, wherein at least one subfile is distributed from the first node to each recipient node of the first group but not all of the plurality of subfiles are distributed from the first node to any of the recipient nodes of the first group, and (c) the plurality of recipient nodes of the first group exchanging their respective subfiles such that each recipient node of the first group obtains all of the plurality of subfiles.

In accordance with another embodiment, a system comprises a means for logically organizing a plurality (n) of recipient nodes to which a file F is to be distributed into a plurality of groups of recipient nodes, wherein each group comprises a plurality of the recipient nodes. The system further comprises a means for determining a number k of concurrent communication connections that can be supported by any one of the nodes for concurrent communication with a plurality of the other nodes, and a means for distributing the file F to the recipient nodes. The system further comprises a means for computing $$\frac{n}{k},$$

wherein if $$\frac{n}{k} = m$$

then (a) the organizing means logically organizes the n recipient nodes into m groups each comprising k recipient nodes, and (b) the means for distributing the file F comprises means to distribute the file F to each of the m groups as follows: (i) distributing the plurality of subfiles to the recipient nodes of the group, wherein at least one subfile is distributed to each recipient node of the group but not all of the plurality of subfiles are distributed to any of the recipient nodes of the group, and (ii) the recipient nodes of the group exchanging their respective subfiles such that each recipient node of the group obtains all of the plurality of subfiles.

In accordance with another embodiment, a system comprises an origin node comprising a file F, and a plurality of recipient nodes to which the file F is to be distributed, wherein the plurality of recipient nodes are logically organized into a plurality of groups, each group comprising a plurality of the recipient nodes. The origin node is operable to partition the file F into a plurality of subfiles, and the origin node operable to distribute all of the plurality of subfiles to recipient nodes of a first group, wherein at least one subfile is distributed from the origin node to each recipient node of the first group but not all of the plurality of subfiles are distributed from the origin node to any of the recipient nodes of the first group. The recipient nodes of the first group are operable to exchange their respective subfiles received from the origin node such that each recipient node of the first group obtains all of the plurality of subfiles. At least one of the recipient nodes of the first group is operable to distribute all of the plurality of subfiles to recipient nodes of a second group, wherein at least one subfile is distributed from the at least one node to each recipient node of the second group but not all of the plurality of subfiles are distributed from the at least one node to any of the recipient nodes of The second group. And, the recipient nodes of the second group are operable to exchange their respective subfiles received from the at least one node such that each recipient node of the second group obtains all of the plurality of subfiles.

In accordance with another embodiment, a method of distributing a file F from a first node to a plurality of recipient nodes is provided. The method comprises logically organizing a plurality of recipient nodes to which a file F is to be distributed into a plurality of groups of recipient nodes, wherein each group comprises a plurality of the recipient nodes. The method further comprises distributing the file F to the recipient nodes of the plurality of groups, wherein the distributing includes (a) partitioning the file F into a plurality of subfiles, (b) distributing the plurality of sub files from a first node to a first group of recipient nodes, wherein at least one subfile is distributed from the first node to each recipient node of said first group but not all of the plurality of subfiles are distributed from the first node to any of the recipient nodes of the first group, (c) the plurality of recipient nodes of the first group exchanging their respective subfiles such that each recipient node of the first group obtains all of the plurality of subfiles, and (d) distributing the file F from the first group to at least one other group of recipient nodes.

BRIEF DESCRIPTION OF THE DRAWINGS

FIGS. 11A–11B show an example operational flow diagram for distributing a large file to a plurality of recipient nodes in a scalable fashion in accordance with an embodiment of the present invention is shown.

DETAILED DESCRIPTION

Figure 1:
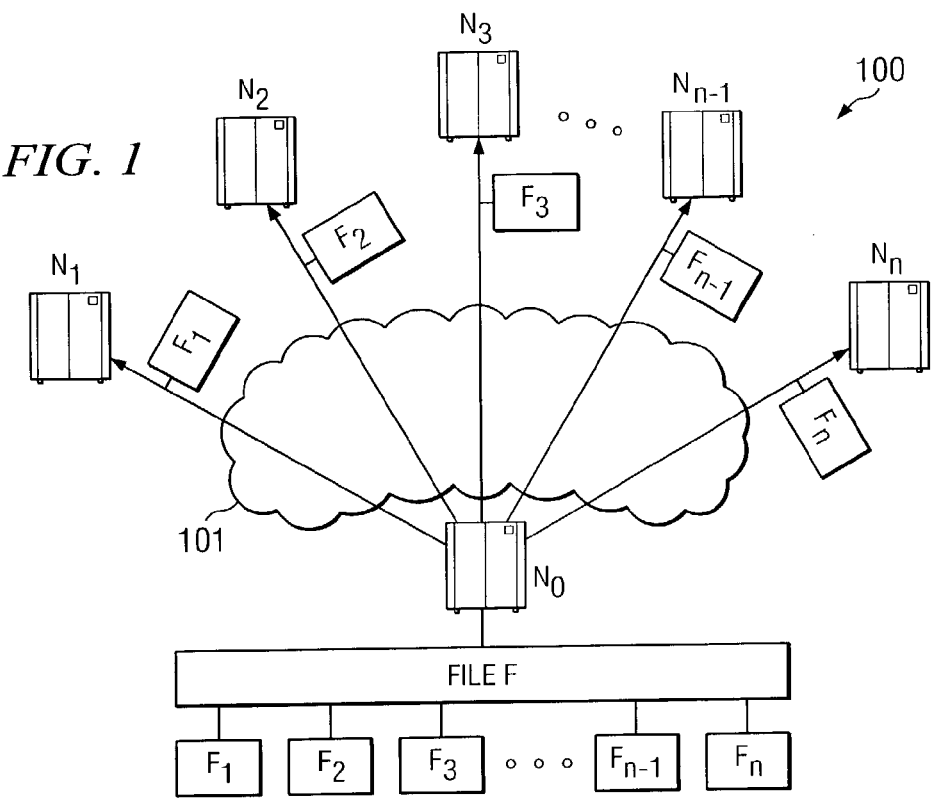
FIG. 1 shows an example environment in which embodiments of the present invention may be utilized and illustrates an example of distributing subfiles from an origin node to a plurality of recipient nodes in accordance with a file distribution technique of an embodiment of the present invention.

Various embodiments of the present invention are now described with reference to the above figures, wherein like reference numerals represent like parts throughout the several views. As described further below, embodiments of the present invention provide a system and method for distributing a file from a first node (which may be referred to herein as the "origin" node) to a plurality of recipient nodes. In certain embodiments, the plurality of recipient nodes comprise servers, such as edge servers in a CDN or mirror servers as examples. Of course, embodiments of the present invention may also be utilized for distributing a file to client nodes.

According to an embodiment of the present invention, a file distribution technique is provided that is scalable for application in distributing a file to a very large number of recipient nodes. For instance, embodiments of the present invention enable the recipient nodes to be logically organized into a plurality of different groups, with each group having a plurality of recipient nodes, and a file is efficiently distributed to the plurality of groups of recipient nodes.

According to one embodiment, the file to be distributed is partitioned into a plurality of parts (or "subfiles"), and the plurality of parts are distributed from the origin node to a first group of recipient nodes. More particularly, all of the sub files comprising the file to be distributed are communicated from the origin node to the recipient nodes of the first group, but the origin node does not send all of the subfiles to each recipient node of the first group. That is, the origin node sends only a portion of the subfiles that comprise the file to be distributed to each recipient node of the first group. For instance, in one embodiment, each recipient node of the first group receives a different one of the subfiles of the file to be distributed. Thereafter, the recipient nodes of the first group exchange their respective subfiles with each other, thus resulting in each recipient node of the first group obtaining the full file. Accordingly, the origin node is not required to communicate the full file to each recipient node of the first group, but rather may communicate only a portion thereof to each recipient node of the first group, and those recipient nodes then exchange their respective portions to result in each recipient node of the first group obtaining all subfiles comprising the full file.

Various techniques may be implemented for distributing a file from an origin node to a first group of recipient nodes in the manner described above. One embodiment of the present invention implements a technique referred to herein as the FastReplica distribution technique. With FastReplica, to replicate a large file among a group of n recipient nodes, the original file F is partitioned into n subfiles of approximately equal size and each subfile is transferred from the origin node to a different node in the recipient group. That is, the subfiles are communicated to the recipient nodes from the origin node concurrently. Such transfer of the subfiles from the origin node to the recipient nodes is referred to herein as a "distribution" step. Thereafter, each recipient node propagates its respective subfile (i.e., the subfile that it received from the origin node) to the remaining recipient nodes in the group. That is, each recipient node concurrently communicates its subfile to the other nodes of the group. This exchange of subfiles by recipient nodes is referred to herein as a "collection" step, as the recipient nodes each collect the subfiles comprising file F from the other recipient nodes. Thus, instead of typical replication of the entire file to n nodes by using n communication paths (e.g., Internet paths) connecting the origin node to the replication group, this FastReplica technique exploits n×n communication paths within the replication group where each path is used for transferring the $$\frac{1}{n} - th$$

portion of the file.

As mentioned above, embodiments of the present invention are scalable and enable distribution of a file to a plurality of groups of recipient nodes. Various distribution techniques may be utilized to enable the distribution of a file to a plurality of different groups of recipient nodes. In one implementation, an origin node distributes the subfiles comprising file F to a first group of recipient nodes, such as in the above-described distribution step of the FastReplica distribution technique. Thereafter, the recipient nodes of the first group exchange their respective subfiles, such as in the above-described collection step of the FastReplica distribution technique. While the first group performs this collection step, the origin node may perform a distribution of the subfiles comprising file F to a second group of recipient nodes. Thereafter, the recipient nodes of the second group exchange their respective subfiles, such as in the above-described collection step of the FastReplica distribution technique. While the second group performs this collection step, the origin node may perform a further distribution of the subfiles comprising file F to a third group of recipient nodes. Further, once the first group has performed the collection step, each of those nodes may establish a communication connection to each of the nodes of a fourth group of recipient nodes, and each node of the first group may communicate the subfile that it received from the origin node to each node of the fourth group. Thus, at the end of this distribution from the first group to the fourth group, each node of the fourth group has all of the subfiles comprising file F, and therefore do not need to perform a collection step within such fourth group. Such a distribution from the first group to the fourth group is referred to herein as a "group-to-group" distribution.

In another scaled distribution implementation, an origin node distributes the subfiles comprising file F to a first group of recipient nodes, such as in the above-described distribution step of the FastReplica distribution technique. Thereafter, the recipient nodes of the first group exchange their respective subfiles, such as in the above-described collection step of the FastReplica distribution technique. Thereafter, the recipient nodes of the first group may each act as an origin node to distribute file F to further groups of recipient nodes in a manner such as that used to distribute the file F to this first group, e.g., each node of the first group may use the FastReplica distribution technique to distribute file F to further groups of recipient nodes. In this manner, the FastReplica distribution technique may be performed iteratively wherein after a group of nodes receives file F through the FastReplica distribution technique, each of such nodes may act as an origin node to distribute file F to further groups of nodes using the FastReplica distribution technique. Thus, in this example implementation, each node that is used for distribution of file F to further recipient nodes distributes the file F to a plurality of recipient nodes (e.g., to another group having a plurality of recipient nodes), and therefore such distribution technique may be referred to herein as a "one-to-many" distribution.

As described further below, in certain distribution environments the second scaled distribution technique identified above results in a wider, shorter distribution tree than the first scaled distribution technique identified above. Accordingly, in those environments, the second scaled distribution technique provides improved efficiency in distributing file F. In certain implementations described herein, a hybrid of the above-identified scaled distribution techniques may be used. For instance, "one-to-many" distributions may be performed for certain group(s) of recipient nodes, and "group-to-group" distribution may be performed for other group(s) of recipient nodes.

To better appreciate aspects of embodiments of the present invention, it is appropriate to briefly review the existing techniques in the art for file distribution. Currently, the three most popular methods used for content distribution (or file "replication") in the Internet environment are: (1) satellite distribution, (2) multicast distribution, and (3) application-level multicast distribution.

With satellite distribution, the content distribution server (or the "origin node") has a transmitting antenna. The servers (or "recipient nodes") to which the content should be replicated (or the corresponding Internet Data centers, where the servers are located) have a satellite receiving dish. The original content distribution server broadcasts a file via a satellite channel. Among the shortcomings of the satellite distribution method are that it requires special hardware deployment and the supporting infrastructure (or service) is quite expensive.

With multicast distribution, an application can send one copy of each packet of a file and address it to the group of recipient nodes (IP addresses) that want to receive it. This technique reduces network traffic by simultaneously delivering a single stream of information to hundreds/thousands of interested recipients. Multicast can be implemented at both the data-link layer and the network layer. Applications that take advantage of multicast technologies include video conferencing, corporate communications, distance learning, and distribution of software, stock quotes, and news. Among the shortcomings of the multicast distribution method is that it requires a multicast support in routers, which still is not consistently available across the Internet infrastructure.

Since the native IP multicast has not received widespread deployment, many industrial and research efforts have shifted to investigating and deploying the application level multicast, where nodes across the Internet act as intermediate routers to efficiently distribute content along a predefined mesh or tree. A growing number of researchers have advocated this alternative approach, where all multicast related functionality, including group management and packet replication, is implemented at end systems. In this architecture, nodes participating in the multicast group self-organize themselves into a scalable overlay structure using a distributed protocol. Further, the nodes attempt to optimize the efficiency of the overlay by adapting to changing network conditions and considering the application-level requirements.

An extension for the end-system multicast is introduced by J. Byers, J. Considine, and M. Mitzenmacher in "Informed Content Delivery Across Adaptive Overlay Networks", *Proc. Of ACM SIGCOMM,* 2002, in which instead of using the end systems as routers forwarding the packets, the authors propose that the end-systems actively collaborate in an informed manner to improve the performance of large file distribution. The main idea is to overcome the limitation of the traditional service models based on tree topologies where the transfer rate to the client is defined by the bandwidth of the bottleneck link of the communication path from the origin server. The authors propose to use additional cross-connections between the end-systems to exchange the complementary content these nodes have already received. Assuming that any given pair of end-systems has not received exactly the same content, these cross-connections between the end-systems can be used to "reconcile" the differences in received content in order to reduce the total transfer time.

As mentioned above, embodiments of the present invention may implement a distribution technique referred to herein as the FastReplica distribution technique. Example embodiments implementing such FastReplica technique are described further below. Consider the following notations:

(a) Let $N_0$ be a node (which may be referred to as an "origin node" or "origin server") which has an original file F, and let Size(F) denote the size of file F in bytes; and (b) Let $R=\{N_1, \ldots, N_n\}$ be a replication set of nodes (i.e., a set of recipient nodes to which the file F is to be distributed).

The problem becomes replicating file F across nodes $N_1, \ldots, N_n$, while minimizing the overall replication time. In one embodiment, a relatively small group of recipient nodes $N_1, \ldots, N_n$ exist (e.g., a sufficiently small number of recipient nodes such that each node $N_0, \ldots, N_n$ can support concurrent communication connections to all of the other n−1 nodes, which is typically 30 or less recipient nodes). The FastReplica technique may be implemented for application to a relatively small number n (e.g., approximately 30 or less) of recipient nodes, wherein such an implementation may be referred to herein as "FastReplica in the Small." In this FastReplica in the Small technique, file F is divided into n equal subsequent subfiles: $F_1, \ldots, F_n$, where $$\text{Size}(F_i) = \frac{\text{Size}(F)}{n}$$

bytes for each i: $1 \leq i \leq n$.

The FastReplica in the Small algorithm then performs a distribution step in which origin node $N_0$ opens n concurrent network connections to nodes $N_1, \ldots, N_n$, and sends to each recipient node $N_i$ ($1 \leq i \leq n$) the following items:

(a) a distribution list of nodes $R=\{N_1, \ldots, N_n\}$ to which subfile $F_i$ is to be sent in the next step (each node $N_i$ is itself excluded from its distribution list); and (b) subfile $F_i$.

An example of this distribution step of the FastReplica algorithm is shown in FIG. 1. For instance, FIG. 1 shows an example environment 100 in which embodiments of the present invention may be utilized. Environment 100 comprises origin node $N_0$ and recipient nodes $N_1, N_2, N_3, \ldots, N_{n-1}, N_n$ that are communicatively coupled via communication network 101. Communication network 101 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other. In certain embodiments, nodes $N_0$–$N_n$ comprise server computers. For instance, nodes $N_1, \ldots, N_n$ may comprise edge servers in a CDN or mirror servers within a mirrored network. In other embodiments, nodes $N_0$–$N_n$ may comprise server and/or client computers. For example, node $N_0$ may comprise a server computer, and nodes $N_1, \ldots, N_n$ may comprise client computers to receive a file (e.g., software application file, etc.) from node $N_0$.

Origin node $N_0$ comprises file F stored thereto, and such file F is partitioned into n subfiles $F_1, F_2, F_3, F_{n-1}, F_n$ wherein the sum of subfiles $F_1, F_2, F_3, F_{n-1}, F_n$ comprise the total file F. As shown, the plurality of subfiles are distributed from origin node $N_0$ to the recipient nodes $N_1, \ldots, N_n$. More particularly, all of the n subfiles comprising file F are communicated from origin node $N_0$ to the recipient nodes $N_1, \ldots, N_n$, but origin node $N_0$ does not send all of the n subfiles to each recipient node. That is, origin node $N_0$ sends only a portion of the n subfiles to each recipient node. For instance, in this example, each recipient node receives a different one of the n subfiles from origin node $N_0$. More particularly, origin node $N_0$ communicates subfile $F_1$ to node $N_1$, subfile $F_2$ to node $N_2$, subfile $F_3$ to node $N_3, \ldots$, subfile $F_{n-1}$ to node $N_{n-1}$, and subfile $F_n$ to node $N_n$ via communication network 101.

Figure 2:
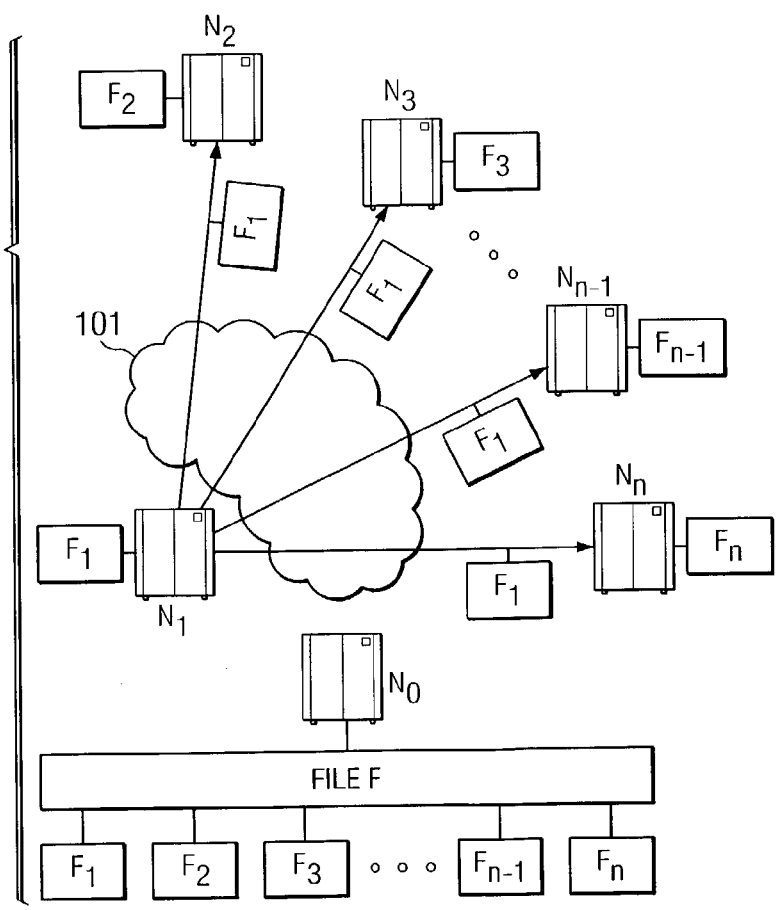
FIG. 2 shows an example of a recipient node communicating the subfile that it received from an origin node to other recipient nodes in accordance with the file distribution technique of FIG. 1.

The next step of the FastReplica algorithm is referred to herein as the collection step. An example of the collection step is described herein in conjunction with FIGS. 2 and 3. After receiving file $F_i$, node $N_i$ opens (n−1) concurrent network connections to remaining nodes in the recipient group and sends subfile $F_i$ to them, as shown in FIG. 2 for node $N_1$. More particularly, FIG. 2 shows that node $N_1$ opens n−1 concurrent network connections, i.e., one network connection with each of recipient nodes $N_2, \ldots, N_n$. Node $N_1$ communicates subfile $F_1$, which it received from origin node $N_0$ in the above-described distribution step, to each of the recipient nodes $N_2, \ldots, N_n$.

Figure 3:
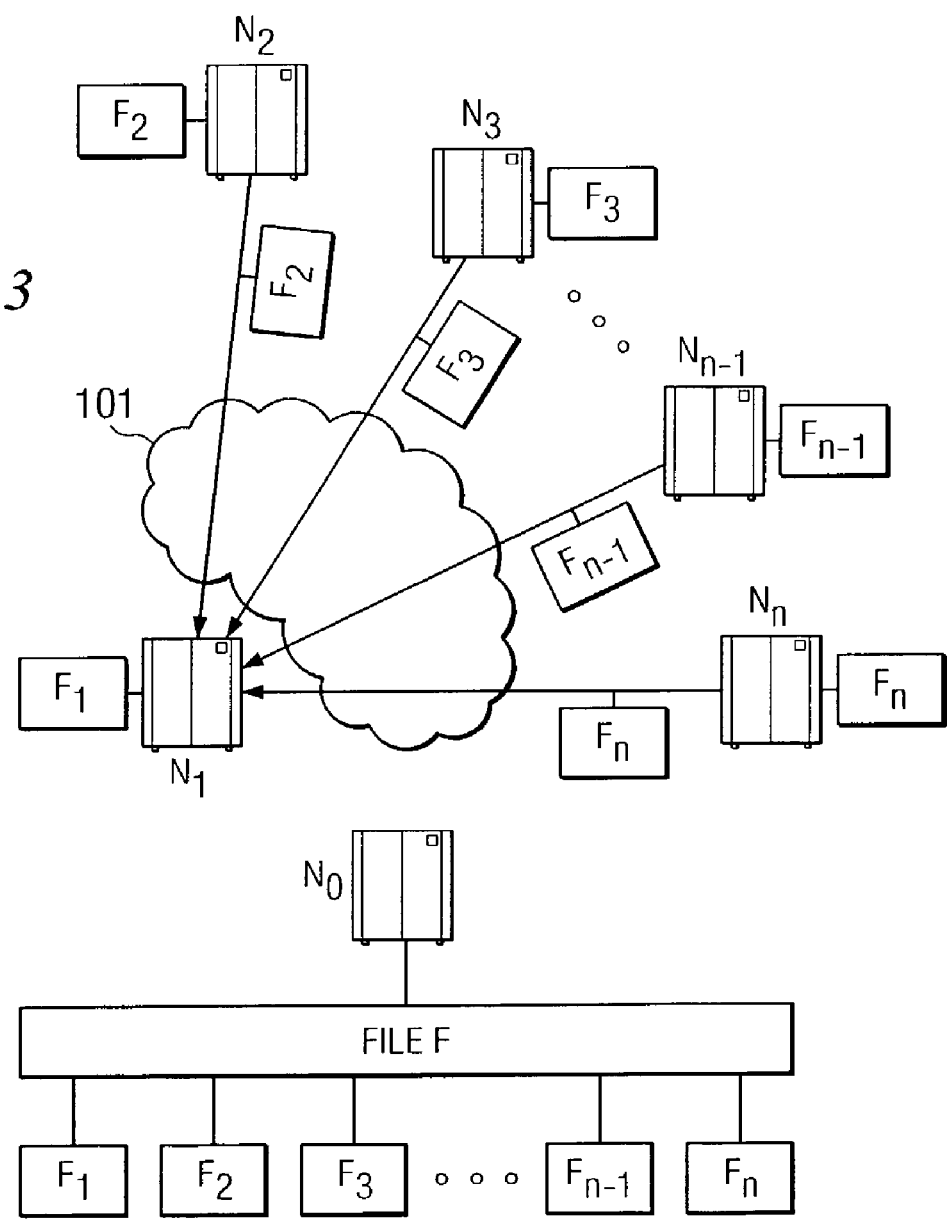
FIG. 3 shows an example of a recipient node receiving subfiles from each of the other recipient nodes in accordance with the file distribution technique of FIG. 1.

Similarly, FIG. 3 shows the set of incoming, concurrent connections to node $N_1$ from the remaining recipient nodes $N_2, \ldots, N_n$, transferring the complementary subfiles $F_2, \ldots, F_n$ during the collection step of the FastReplica algorithm. More particularly, FIG. 3 shows that node $N_1$ has n−1 concurrent network connections, i.e., one network connection with each of recipient nodes $N_2, \ldots, N_n$, through which node $N_1$ receives the other subfiles comprising file F from the recipient nodes $N_2, \ldots, N_n$. That is, each of recipient nodes $N_2, \ldots, N_n$ communicates its respective subfile that it received from origin node $N_0$ in the above-described distribution step to node $N_1$.

Thus at the end of this collection step, each node $N_i$ has the following set of network connections:

(a) there are n−1 outgoing connections from node $N_i$: one connection to each node $N_k$ ($k \neq i$) for sending the corresponding subfile $F_i$ to node $N_k$; and (b) there are n−1 incoming connections to node $N_i$: one connection from each node $N_k(k \neq i)$ for sending the corresponding subfile $F_k$ to node $N_i$.

Thus, at the end of this collection step, each recipient node receives all subfiles $F_1, \ldots, F_n$ comprising the entire original file F. Accordingly, each of the nodes in the replication set R obtain the full file F (which is reconstructed through the received subfiles).

In view of the above, it should be recognized that instead of the typical replication of an entire file to n nodes by using n communication paths connecting the origin node $N_0$ to the replication group, the example FastReplica algorithm described above exploits n×n different communication paths within the replication group wherein each path is used for transferring $$\frac{1}{n} - th$$

of the file F. Thus, the impact of congestion on any particular communication path participating in the schema is limited for a transfer of $$\frac{1}{n} - th$$

of the file F. Additionally, the example FastReplica algorithm described above takes advantage of both the upload and download bandwidth of the recipient nodes. Typical servers in CDN environments have symmetrical upload and download bandwidth to be able to utilize this feature. Such FastReplica algorithm and its efficiency for various types of bandwidths that may be available between the nodes is discussed further in U.S. Published Patent Application Number 2004-0143575 titled "SYSTEM AND METHOD FOR EFFICIENTLY REPLICATING A FILE AMONG A PLURALITY OF RECIPIENTS", the disclosure of which is hereby incorporated herein by reference.

Figure 4:
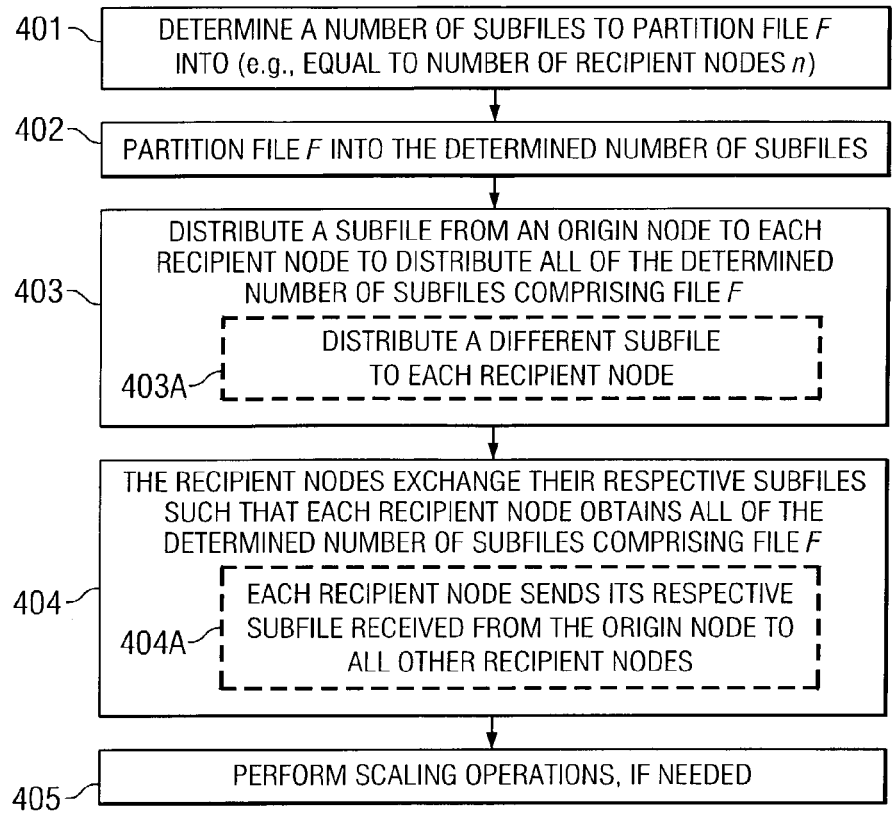
FIG. 4 shows an example operational flow diagram for distributing a file from an origin node to a plurality of recipient nodes in accordance with an embodiment of the present invention.

FIG. 4 shows an example operational flow diagram for distributing a file from an origin node to a plurality of recipient nodes in accordance with an embodiment of the present invention. In operational block 401, a number of subfiles into which file F is to be partitioned is determined. For instance, as shown in the example of FIGS. 1–3 above, in certain embodiments a FastReplica technique may be implemented in which file F may be partitioned into a number of subfiles corresponding to the number of recipient nodes n of a group to which the file F is to be distributed (if the number n of recipient nodes is sufficiently small such that each node $N_0, \ldots, N_n$ can support concurrent communication connections to all of the other n−1 nodes). In other implementations, the file F may be partitioned into a number of subfiles corresponding to the number k of concurrent communication connections that can be supported by each of the nodes $N_0, \ldots, N_n$ (wherein if k is less than the total number of recipient nodes n, then the distribution technique may be scaled for distribution to a plurality of groups of recipient nodes as described further below). In operational block 402, file F is partitioned into the determined number of subfiles.

In operational block 403, a subfile is distributed from an origin node to each recipient node, wherein all of the subfiles comprising file F are distributed to the recipient nodes. As shown, in certain embodiments block 403 may comprise operational block 403A, wherein a different subfile is distributed to each recipient node within the distribution group, as in the example of FIGS. 1–3 above in which the FastReplica technique is implemented. That is, each recipient node may receive a unique subfile from the origin node that is not received by any of the other recipient nodes within the distribution group.

In operational block 404, the recipient nodes exchange their respective subfiles such that each recipient node obtains all of the determined number of subfiles comprising file F. As shown, in certain embodiments block 404 may comprise operational block 404A wherein each recipient node sends its respective subfile received from the origin node to all other recipient nodes, as in the above-described FastReplica implementation.

In operational block 405, scaling operations may be performed, if needed. That is, if the number of recipient nodes is sufficiently large, the distribution process may be scaled to enable distribution to such a large number of recipient nodes. For instance, the distribution technique may be scaled to allow for a file distribution to hundreds, thousands, or tens of thousands, of recipient nodes, for example. More particularly, if it is determined that the number k of concurrent communication connections that can be supported by each of the nodes $N_0, \ldots, N_n$ is less than the total number of recipient nodes n, then the distribution technique may be scaled for distribution to a plurality of groups of recipient nodes as described further below. Various suitable scaling techniques may be utilized.

One scaling technique that may be implemented is described in U.S. Published Patent Application Number 2004-0143575 titled "SYSTEM AND METHOD FOR EFFICIENTLY REPLICATING A FILE AMONG A PLURALITY OF RECIPIENTS", the disclosure of which has been incorporated herein by reference. This first scaling technique that may be implemented is described herein below in conjunction with FIGS. 5–8. According to this first scaling technique, the above-described FastReplica in the Small distribution strategy is generalized to a case in which a set of nodes to which file F is to be distributed is very large (e.g., hundreds, thousands, tens of thousands, or more of such recipient nodes). According to one example implementation of this scaling technique, let k be a number of network connections chosen for concurrent transfers between a single node and multiple recipient nodes (k limits the number of nodes in each distribution group for the above-described FastReplica strategy). An appropriate value of k can be experimentally determined for a given environment via probing, for example. Heterogeneous nodes might be capable of supporting a different number of connections, in which case the value of k may be a number of connections suitable for most of the nodes in the overall replication set.

Figure 5:
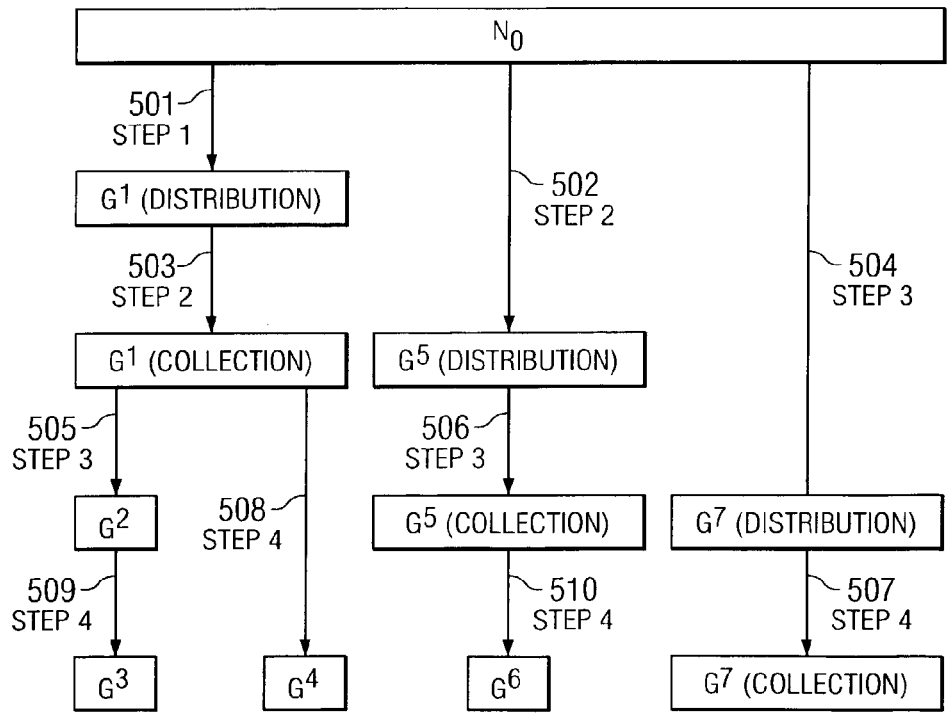
FIG. 5 shows a first example scaling technique for a file distribution process of an embodiment of the present invention.

File F is divided in k equal subsequent subfiles: $F_1, \ldots, F_k$, where $$Size(F_i) = \frac{Size(F)}{k}$$

bytes for each $1 \leq i \leq k$. This example scaling technique is described in conjunction with FIG. 5 in which $G^1, G^2, \ldots, G^7$ are used to denote the replication groups of nodes, each group having k nodes. The boxes in the example of FIG. 5 reflect the node or group of nodes involved in the communications on a particular logical step of the algorithm. FIG. 5 provides an example in which 4 logical steps are performed in the scaled distribution process, but as will be recognized from the description of such scaled distribution process any other number of logical steps may be appropriate in other implementations (depending on the number of nodes to which the file F is being distributed).

First, in the example of FIG. 5, origin node $N_0$ opens k concurrent network connections to nodes $N_1^1, \ldots, N_k^1$ of group $G^1$, and sends subfile $F_i$ to the corresponding recipient node $N_i^1 (1 \leq i \leq k)$. This first step is represented by communication path(s) 501 to box $G^1$(distribution) in FIG. 5 and is similar to the distribution step of FastReplica in the Small described above.

In the second step of this example scaled distribution algorithm:

(a) In group $G^1$, each node $N_i^1$ sends its subfile $F_i$ to the rest of the nodes in group $G^1$. In this way, at the end of this step, each node in group $G^1$ has all subfiles $F_1, \ldots, F_k$ of original file F. This step is represented by communication path(s) 503 to box $G^1$(collection) in FIG. 5 and is similar to the collection step of FastReplica in the Small described above. It should be noted that the activities performed in this second step are not synchronized between the different nodes of group $G^1$. Rather, Node $N_i^1$ starts transferring its subfile F to the remaining nodes of group $G^1$ independently of the similar step performed by the other nodes. This distributed nature of the FastReplica algorithm makes it more efficient. Thus, during the same physical time, the nodes in the group can perform different logical steps of the algorithm. For example, while some of the nodes of $G^1$ might be still finishing step 2 of the algorithm, some of the "faster" nodes of $G^1$ might start transfers related to step 3 of the algorithm (described below).

(b) In the same logical step (step 2), originator node $N_0$ opens k concurrent network connections to nodes $N_1^5, \ldots, N_k^5$ of group $G^5$, and using these i connections, it sends subfile $F_i$ to the corresponding recipient node $N_1^5$ in group $G^5$ $1 \leq i \leq k$. This step is represented by communication path(s) 502 to box $G^5$(distribution) in FIG. 5.

Figure 6:
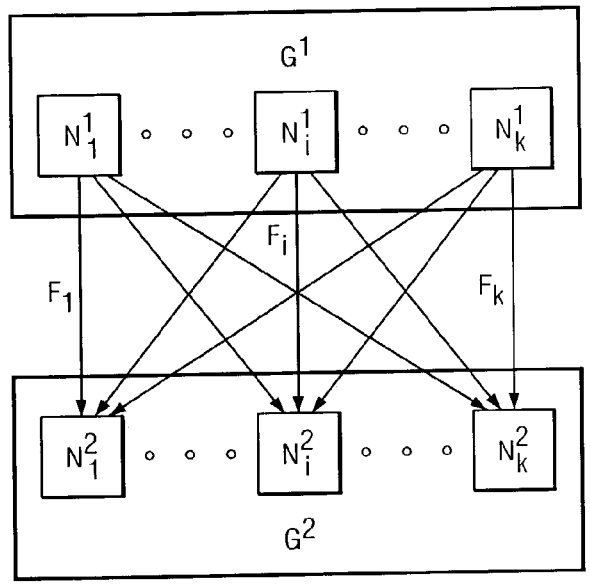
FIG. 6 shows communication paths between two groups of nodes in the first scaled distribution process of FIG. 5.
Figure 7:
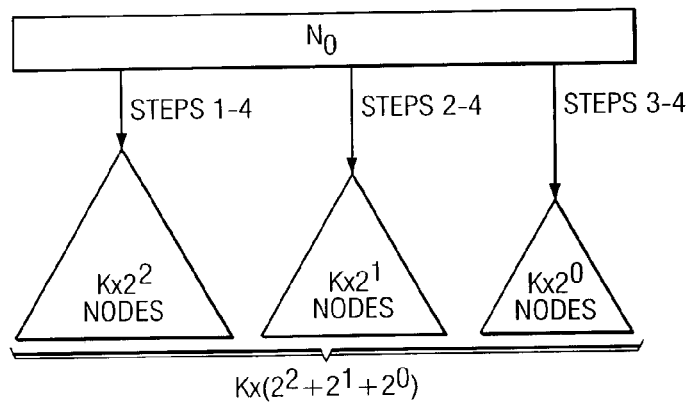
FIG. 7 shows a graphical representation of the number of recipient nodes to which a file F can be replicated in 4 logical steps in accordance with the first scalable file distribution process of FIG. 5.

The above communications at steps 1 and 2 are similar to the communications defined in the example FastReplica in the Small algorithm described above. In step 3 of this example scaled distribution algorithm, the communications between groups $G^1$ and $G^2$ follow a different file exchange protocol defining another typical communication pattern actively used in the general FastReplica algorithm. Step 3 of FIG. 5 may be referred to herein as a general step, and includes the following operations:

(a) Each node $N_i^1$ of group $G^1$ opens k concurrent network connections to all k nodes of group $G^2$ for transferring its subfile $F_i$. In this way, at the end of this step, each node of group $G^2$ has all subfiles $F_1, \ldots, F_k$ of original file F. This step is represented by communication path(s) 505 to box $G^2$ in FIG. 5. The communications between the nodes in groups $G^1$ and $G^2$ are shown in more detail in FIG. 6. Turning briefly to FIG. 6, it can be seen that node $N_1^1$ of group $G^1$ distributes the subfile that it originally received from origin node $N_0$ (i.e., subfile $F_1$) to each of nodes $N_1^2, \ldots, N_k^2$ of group $G^2$ via concurrent communication connections therewith. Similarly, node $N_i^1$ of group $G^1$ distributes the subfile that it originally received from origin node $N_0$ (i.e., subfile $F_i$) to each of nodes $N_1^2, \ldots, N_k^2$ of group $G^2$ via concurrent communication connections therewith. Likewise, node $N_k^1$ of group $G^1$ distributes the subfile that it originally received from origin node $N_0$ (i.e., subfile $F_k$) to each of nodes $N_1^2, \ldots, N_k^2$ of group $G^2$ via concurrent communication connections therewith. Because of the manner in which each node $N_i^1$ of group $G^1$ opens k concurrent network connections to all k nodes of group $G^2$ for transferring its subfile $F_i$, this scaled distribution technique may be referred to as a "group-to-group" distribution technique. That is, because the nodes of a first group each communicate the respective subfile that they received from origin node $N_0$ to each of the nodes of a second group, the file is distributed directly from the first group to the second group without requiring exchange of information between the nodes of the second group.

(b) Also in logical step 3 of FIG. 5, in group $G^5$, each node $N_i^5$ sends its subfile $F_i$ to the rest of the nodes in the group. In this way, at the end of this step, each node in group $G^5$ has all subfiles $F_1, \ldots, F_k$ of original file F. This step is represented by communication path(s) 506 to box $G^5$(collection) in FIG. 5.

(c) At the same logical step 3 of FIG. 5, origin node $N_0$ opens k concurrent network connections to nodes $N_1^7, \ldots, N_k^7$ of group $G^7$, and using i connection, it sends the subfile $F_i$ to the corresponding recipient node $N_i^7$ in group $G^7$ $(1 \leq i \leq k)$. This step is represented by communication path(s) 504 to box $G^7$ (distribution) in FIG. 5.

Next, logical step 4 is performed in this scaled distribution example of FIG. 5. Step 4 comprises the following operations:

(a) In group $G^2$, each node $N_i^2$ sends its subfile $F_i$ to all k nodes in group $G^3$ (in a manner as described above with FIG. 6). Thus at the end of this step, each node in group $G^3$ has all subfiles $F_1, \ldots, F_k$ of original file F. This step is represented by communication path(s) 509 to box $G^3$ in FIG. 5.

(b) In group $G^1$, each node $N_i^1$ sends its subfile $F_i$ to all k nodes in group $G^4$ (in a manner as described above with FIG. 6). In this way, at the end of this step, each node in group $G^4$ has all subfiles $F_1, \ldots, F_k$ of original file F. This step is represented by communication path(s) 508 to box $G^4$ in FIG. 5.

(c) In group $G^5$, each node $N_i^1$ opens k concurrent network connections to all k nodes of group $G^6$ for transferring its subfile $F_i$ (in a manner as described above with FIG. 6). At the end of this step, each node in the group $G^6$ has all subfiles $F_1, \ldots, F_k$ of original file F. This step is represented by communication path(s) 510 to box $G^6$ in FIG. 5.

(d) In the same logical step 4, in the group $G^7$, each node $N_i^1$ sends its subfile $F_i$ to the rest of the nodes in the group. In this way, at the end of this step, each node in group $G^6$ has all subfiles $F_1, \ldots, F_k$ of original file F. This step is represented by the communication path(s) 507 to box $G^7$(collection) in FIG. 5, and is analogous to the collection step described above with the FastReplica in the Small algorithm.

Techniques for improving the reliability of this first scalable distribution algorithm to account for failed nodes may be implemented, such as those techniques disclosed in U.S. Published Patent Application Number 2004-0143647 titled "SYSTEM AND METHOD FOR EFFICIENTLY REPLICATING A FILE AMONG A PLURALITY OF RECIPIENTS IN A RELIABLE MANNER", the disclosure of which is hereby incorporated herein by reference.

A relatively simple induction rule defines the number of nodes to which the original file F can be replicated in 4 logical steps (such as the 4 logical steps of FIG. 5) in this first scalable distribution algorithm: $k \times (2^2 + 2^1 + 2^0)$, which is graphically shown in FIG. 7.

The example considered above with FIG. 5 can be generalized to the arbitrary number of algorithm steps i, where $i \geq 2$. The number of nodes to which original file F can be replicated in i algorithm steps is defined by the following formula:

$$k \times \sum_{j=2}^{i} 2^{i-j}.$$

From this binary representation, the rules for constructing the corresponding distribution lists of nodes are straightforward. Once the nodes to be included in a distribution list are determined, constructing such distribution lists may be performed in accordance with techniques well known in the art. That is, it is within the skill of those in the art to construct such a distribution list, and therefore the technical details of the distribution lists construction is not elaborated on further herein so as not to detract from the inventive features described herein for distributing a file from an origin node to a plurality of recipient nodes.

This first example scaling technique for the above-described FastReplica algorithm is based on the reasoning described above. Consider the problem of replicating file F across nodes $N_1, \ldots, N_n$ and let $$\frac{n}{k} = m.$$

Then, all of the nodes may be partitioned into m groups: $G^1, G^2, \ldots, G^m$, where each group has k nodes. Any number m can be represented as $m = 2^{i_1} + 2^{i_2} + \ldots + 2^{i_j}$ (referred to herein as "Equation 1"), where $i_1 > i_2 > \ldots > i_j \geq 0$. Practically, this provides a binary representation of a number m. Then schematically, the above-described scalable FastReplica algorithm replicates file F to corresponding groups $G^1, G^2, \ldots, G^m$ in $i_1 + 2$ steps as graphically shown in FIG. 8.

Figure 8:
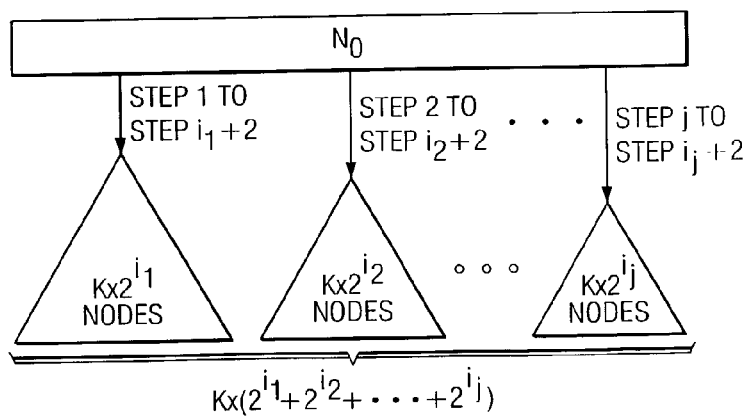
FIG. 8 shows a graphical representation of the number of recipient nodes to which a file F can be replicated in j logical steps in accordance with the first scalable file distribution process of FIG. 5.

If the targeted number n of nodes for a file replication is not a multiple of k, i.e., $$\frac{n}{k} = m + r,$$

where $r < k$, then there is one "incomplete" group G' with r nodes in it. A preferred way to deal with this group in this first scaling technique is to arrange it to be a leaf-group in the biggest sub-tree (i.e., the sub-tree having the longest path from node $N_0$), which replicates the original file to $2^{i_1}$ groups as shown in FIG. 8, e.g., group G' is assigned group number $2^{i_1}$.

As an example, let k=10. How many algorithm steps are used in the example scalable FastReplica algorithm described above to replicate the original file F to 1000 nodes? Using Equation 1 above, the following representation for 1000 nodes is derived: $1000 = 10 \times (2^6 + 2^5 + 2^2)$. Thus, in 8 algorithm steps (each taking the $$\frac{1}{k} - th$$

portion of the file to transfer), the original file F will be replicated among all 1000 nodes.

From the above, it should be recognized that this first scaling technique results in a relatively narrow scaling tree (such as the example scaling tree of FIG. 5). That is, the overall length of the sub-tree paths from node $N_0$ is relatively long as compared to the width of the tree (i.e., the number of groups at each level of the tree). Generally, a wider scaling tree is desired for greater efficiency. A second scaling technique that results in a wider scaling tree in many distribution environments than that of the first scaling technique, which may be used with file distribution techniques of embodiments of the present invention, such as the above-described FastReplica distribution technique, is described below in conjunction with FIGS. 9–11B.

Considering this second scaling technique, let k be a number of network connections chosen for concurrent transfers between a single node and multiple receiving nodes (i.e. k limits the number of nodes in the group for the above-described FastReplica strategy). A natural way to scale the above-described FastReplica in the Small algorithm to a large number of recipient nodes is:

(a) partition the original set of nodes into replication groups, each consisting of k nodes; and (b) apply FastReplica in the small iteratively: first, replicate the original file F to a first group of k nodes, and then use these k nodes of the first group as origin nodes with file F to repeat the same distribution procedure to further groups of nodes.

Figures 9, 10:
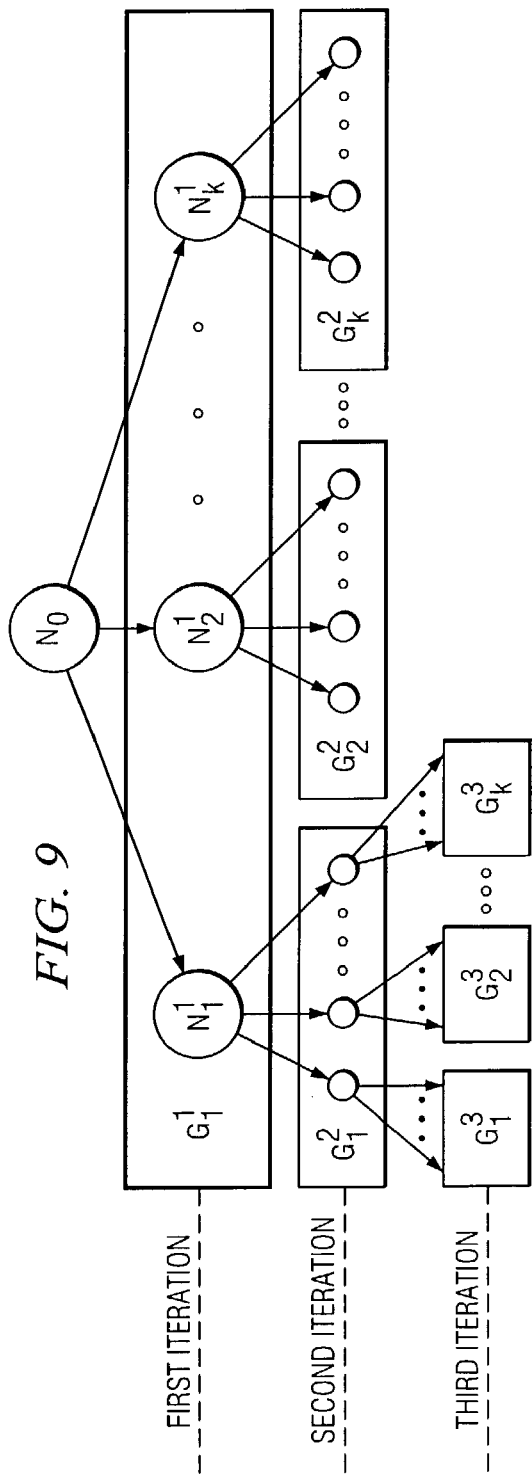
FIG. 9 shows a second example scaling technique for a file distribution process of an embodiment of the present invention.
FIG. 10 shows communication paths between a complete group of nodes and an incomplete group of nodes in the example second scaled distribution process of FIG. 9.

Schematically, this procedure is shown in FIG. 9, where circles represent nodes, and boxes represent replication groups. The arrows, connecting one node with a set of other nodes, reflect the origin node and the recipient nodes involved in communications on a particular iteration of this second distribution algorithm.

At the first iteration shown in the example of FIG. 9, origin node $N_0$ replicates file F to a first group $G_1^1$ having k nodes (i.e., nodes $N_1^1, N_2^1, \ldots, N_k^1$) using the above-described FastReplica in the Small algorithm. That is, in the first iteration, origin node $N_0$ distributes a plurality of subfiles comprising file F to nodes $N_1^1, N_2^1, \ldots, N_k^1$ of first group $G_1^1$, and then such recipient nodes $N_1^1, N_2^1, \ldots, N_k^1$ exchange their respective subfiles such that all of the recipient nodes of the first group $G_1^1$ obtain the full file F. Such first group $G_1^1$ may be referred to herein as a first-level group of nodes.

At the second iteration, each node $N_i^1 (1 \leq i \leq k)$ of group $G_1^1$ can serve as an origin node propagating file F to the nodes of other groups $G_1^2, G_2^2, \ldots, G_k^2$. Such groups $G_1^2, G_2^2, \ldots, G_k^2$ may be referred to herein as second-level groups of nodes. For instance, node $N_1^1$ of first-level group $G_1^1$ partitions file F into a plurality of subfiles and communicates such subfiles to the recipient nodes of second-level group $G_1^2$ in a manner similar to that described above in FIG. 1 for origin node $N_0$ communicating subfiles to nodes $N_1$–$N_n$. In other words, node $N_1^1$ of first-level group $G_1^1$ performs a distribution step to distribute a plurality of subfiles comprising file F to the recipient nodes of second-level group $G_1^2$. Preferably, node $N_1^1$ of first-level group $G_1^1$ establishes k concurrent communication connections with the k nodes of second-level group $G_1^2$ and communicates the subfiles comprising file F to the nodes of second-level group $G_1^2$ concurrently. Thereafter, the nodes of second-level group $G_1^2$ exchange their respective received subfiles. In other words, the nodes of second-level group $G_1^2$ perform a collection step, such as that described above for the FastReplica algorithm.

Similarly, each other node $N_2^1, \ldots, N_k^1$ of first-level group $G_1^1$ may concurrently (in iteration 2) distribute file F to second level groups $G_2^2, \ldots, G_k^2$, respectively, in a similar manner to that described above for distribution from node $N_1^1$ to group $G_1^2$ (e.g., using the above-described FastReplica distribution technique). This distribution technique may be referred to herein as an iterative "one-to-many" distribution technique, as each node of each group at each level may act as an origin node to distribute file F to many nodes comprising a group at a next level.

In view of the above, in two iterations, file F can be replicated to k×k nodes using this iterative one-to-many distribution technique. Correspondingly, in three iterations, file F can be replicated to k×k×k nodes, and so on. As an example of grouping the recipient nodes, suppose it is desired to replicate file F across nodes $N_1, \ldots, N_n$ and let $$\frac{n}{k} = m.$$

Then all of the nodes may be partitioned into m groups: $G^1, G^2, \ldots, G^m$, where each group has k nodes. Any number m can be represented in this second scaling technique as: $m = c_1 \times k^{i_1} + c_2 \times k^{i_2} + \ldots + c_j \times k^{i_j}$ (referred to herein as "Equation 2"), where $i_1 > i_2 > \ldots > i_j \geq 0$ and $0 < c_1, \ldots, c_j < k$, and wherein "c" is an in Practically, this provides a k-ary representation of a number m. This representation defines the rules for constructing the tree structure similar to the one shown in FIG. 9. In particular, the height of such a tree is $i_1 + 1$, and it defines the number of iterations using the second scaled distribution technique described above.

From this k-ary representation, the rules for constructing the corresponding distribution lists of nodes are straightforward. Once the nodes to be included in a distribution list are determined, constructing such distribution lists may be performed in accordance with techniques well known in the art. That is, it is within the skill of those in the art to construct such a distribution list, and therefore the technical details of the distribution lists construction is not elaborated on further herein so as not to detract from the inventive features described herein for distributing a file from an origin node to a plurality of recipient nodes.

Techniques for improving the reliability of this second scalable distribution algorithm to account for failed nodes may be implemented, such as those techniques disclosed in U.S. Published Patent Application Number 2004-0143595 titled "SYSTEM AND METHOD FOR EFFICIENTLY REPLICATING A FILE AMONG A PLURALITY OF RECIPIENTS HAVING IMPROVED SCALABILITY AND RELIABILITY", the disclosure of which is hereby incorporated herein by reference.

If the targeted number n of nodes for a file replication is not a multiple of k, i.e., $$\frac{n}{k} = m + r,$$

where r<k, then there is one "incomplete" group $\hat{G}$ with r nodes in it. A preferred way to deal with this group when using this second scaling algorithm is to arrange it to be a leaf-group in the shortest subtree. So, assuming for instance that such an incomplete group exists in the example of FIG. 9, it would be arranged in the third level of the distribution tree such that group $G_2^2$ of the second level would act as complete group G' of FIG. 10 for communicating the subfiles to the nodes of the incomplete group.

For example, let $G' = \{N'_1, \ldots, N'_k\}$ be a complete replication group in the shortest subtree. Further, let incomplete group $\hat{G} = \{\hat{N}_1, \ldots, \hat{N}_r\}$ where r<k. The communications between groups G' and $\hat{G}$ may follow a slightly different file exchange protocol than that described above in FIG. 9 for communicating file F from a node of one group to the nodes of another complete group in certain implementations of this second scaling technique. Suppose that all of the nodes in G' have already received all subfiles $F_1, \ldots, F_n$ comprising the entire original file F (e.g., when performing iteration 2 in FIG. 9, all of the nodes of group $G_1^1$ have received all of subfiles $F_1, \ldots, F_n$ comprising the entire original file F, as such subfiles were received in the first iteration). Each node $N_i'$ of group G' opens r concurrent network connections to all r nodes of group G' for transferring its respective subfile $F_i$, as shown in FIG. 10. In this way, at the end of this step, each node of group $\hat{G}$ has all subfiles $F_1, \ldots, F_k$ of original file F. This step may be referred to herein as a special step. It should be recognized that this special step corresponds to the "group-to-group" type of distribution utilized in the first scaling technique described above. Thus, in certain implementations, if a group of recipient nodes is not complete (i.e., does not have k nodes), then the group-to-group distribution technique of the first example scaled distribution may be utilized for communicating the file F to such incomplete group. Accordingly, in certain embodiments, a hybrid of the first example scaling technique described above and the second example scaling technique described above may be utilized. More particularly, both the above-described group-to-group distribution technique and the above-described one-to-many distribution technique may be employed in certain implementations of the scaled distribution algorithm. For instance, the one-to-many distribution technique may be used for all complete groups having k nodes, and the group-to-group distribution technique may be used for any incomplete group that has less than k nodes.

As an example, let k=10 (i.e., 10 concurrent communication connections are determined to be suitable for use between the nodes). How many algorithm iterations are required to replicate the original file F to 1000 nodes using the second scaled distribution technique described above? Using Equation 2 above, the following representation for 1000 nodes can be derived: $1000=10\times10^2$. Thus, in three algorithm iterations ($10\times10\times10$), the original file F can be replicated among all 1000 nodes. At each iteration, the replication process follows the above-described FastReplica in the Small distribution technique, i.e., each iteration has 2 steps (a distribution step and a collection step), each used for transferring the $$\frac{1}{k}-th$$

portion of original file F.

Let Multiple Unicast denote a traditional file distribution schema that transfers the entire file F from the origin node $N_0$ to nodes $N_1, \ldots, N_n$ by simultaneously using n concurrent network connections. As a comparison of such Multiple Unicast with the second scaling technique described above, let Multiple Unicast follow a similar recursive replication tree as the one described above for this second scaling technique of FastReplica (as shown in FIG. 9), with the only difference being that communications between the origin nodes and the recipient nodes follow the Multiple Unicast schema, i.e., the origin node transfers the entire file F to the corresponding recipient nodes by simultaneously using k concurrent network connections in Multiple Unicast. Thus, in three algorithm iterations, by using Multiple Unicast recursively, the original file can be replicated among 1000 nodes.

Consider, for example, an idealistic setting, where nodes $N_1, \ldots, N_n$ have symmetrical (or nearly symmetrical) incoming and outgoing bandwidth, which is typical for CDNs, distributed Internet Data Centers (IDCs), and distributed enterprise environments, as examples. In addition, let nodes $N_0, N_1, \ldots, N_n$ be homogeneous, and each node can support k network connections to other nodes at B bytes per second on average. Using this assumption of homogeneity of nodes bandwidth, the FastReplica in the Small distribution technique described above provides $$\frac{k}{2}$$

times better replication time compared to Multiple Unicast for each iteration, see U.S. Published Patent Number 2004-0143575 for the performance of the FastReplica in the Small distribution technique as compared to the Multiple Unicast distribution technique. Hence, in the example with 1000 nodes and k=10, at each of the three algorithm iterations, the above-described FastReplica technique provides 5 times better file replication time compared to Multiple Unicast.

Therefore, the overall speedup under the second scaled distribution of FastReplica described above as compared to Multiple Unicast for file replication over 1000 nodes is 5 times.

In certain situations the first scaling technique of FastReplica (which uses the "group-to-group" distribution technique) might be a better choice over the second scaling technique of FastReplica described above (which uses the "one-to-many" distribution technique) and vice versa. Various examples to illustrate this point are provided herein below.

First, consider the following example in which the determined suitable number of concurrent communication connections between the nodes is k=10. How many algorithm iterations are required to replicate the original file to 150 nodes by applying i) the first scaling technique of FastReplica described above and ii) the second scaling technique of FastReplica described above?

For the first scaling technique of FastReplica described above: using Equation 1 identified above, the following representation for 150 nodes is derived: $150=10\times(2^3+2^2+2^1+1)$. Thus, in 5 algorithm steps (each taking the $$\frac{1}{k}-th$$

portion of the file to transfer), the original file will be replicated among all 150 nodes in this first scaling technique.

For the second scaling technique of FastReplica described above: using Equation 2 identified above, the following representation for 150 nodes is derived: $150=10^2+5\times10^1$. Thus 3 algorithm iterations are required in order for the original file F to be replicated among all 150 nodes using this second scaling technique. At each iteration, the replication process follows the above-described FastReplica in the Small distribution technique, i.e., the iteration consists of 2 steps (a distribution step and a collection step), each used for transferring the $$\frac{1}{k}-th$$

portion of original file F. Thus, overall this second scaling technique of FastReplica requires 6 steps for distributing the file F to the 150 nodes.

Table 1 below shows a comparison between two the two scaled distribution algorithms identified above for k=10 in more detail. The first column in Table 1 provides the overall number of recipient nodes to which a file F is to be distributed. Notations used in the first column is the following: it shows the range of nodes in the form of the interval such as (30,70], where the round bracket "(" means that the value of 30 is not included in the range of values, and the squared bracket "[" means that the value of 70 is included in the interval. The second and third columns show the number of algorithm steps (each transferring $$\frac{1}{k}th$$

portion of the file) required to replicate the original file F to a given number of nodes (identified in the corresponding first column) using the first scaling technique of FastReplica and using the second scaling technique of FastReplica, respectively.

TABLE 1

| Number of Nodes | First Scaling technique of FastReplica | Second Scaling technique of FastReplica |
| --- | --- | --- |
| (0, 10] | 2 | 2 |
| (10, 20] | 3 | 3 |
| (20, 30] | 3 | 4 |
| (30, 70] | 4 | 4 |
| (70, 100] | 5 | 4 |
| (100, 110] | 5 | 5 |
| (110, 150] | | |
| (150, 310] | 6 | 6 |
| (310, 630] | 7 | 6 |
| (630, 1000] | 8 | 6 |
| (1000, 1010] | 8 | 7 |
| (1010, 1270] | 8 | 8 |

As Table 1 shows, there are intervals of values where the two scaling techniques of FastReplica described above are the same. Additionally, there are intervals of values, such as (20,30], (110,150], where the first scaling technique of FastReplica outperforms the second scaling technique of FastReplica. However, there is a range of values, such as (70,100], (310,1010), and for any number of nodes greater than 1270 (which are not shown in Table 1), in which the second scaling technique of FastReplica outperforms the first scaling technique. Thus, in general, for larger number of nodes the second scaling technique of FastReplica provides better scalability.

Depending on the value of k and the targeted number of nodes in the overall replication set, service providers may choose between the first scaling technique of FastReplica and the second scaling technique of FastReplica described above favoring the algorithm with better performance for a particular range of values.

As one example application of embodiments of the present invention, consider the distribution of streaming media files within a CDN. In order to improve streaming media quality, the latest work in this direction proposes to stream video from multiple edge servers (or mirror sites), and in particular, by combining the benefits of multiple description coding (MDC) with Internet path diversity. MDC codes a media stream into multiple complementary descriptions. These descriptions have the property that if either description is received it can be used to decode the baseline quality video, and multiple descriptions can be used to decode improved quality video.

Thus, for a media file encoded with MDC, different descriptions can be treated as subfiles, and a distribution technique, such as the above-described FastReplica technique, can be applied to replicate them. That is, while the above examples describe partitioning a file into subfiles based, for example, on the number k of concurrent communication connections that can be supported by a node, in certain embodiments the distribution technique may be utilized with a file F encoded with multiple descriptions, wherein each of the multiple descriptions may be distributed to recipient nodes in the manner in which the above-described subfiles of a file F are described as being distributed.

Taking into account the nature of MDC (i.e., that either description received by the recipient node can be used to decode the baseline quality video), the reliability of the scaled FastReplica algorithm may be improved. For instance, when using the first scaling technique described above for distributing a media file encoded with MDC, even if failed nodes exist in the distribution tree, this first scaled FastReplica technique may provide a suitable distribution technique because receipt by nodes below the failed node(s) in the distribution tree of a portion of the descriptions (from the working nodes of the higher level) will be enough to decode the good quality video. That is, when using a group-to-group distribution technique, if one of the nodes in a first group responsible for distributing a particular subfile to the nodes of a second group fails, then the nodes of the second group will not receive this particular subfile. However, the nodes of the second group will still receive the subfiles from the working nodes of the first group, and with MDC encoding, such portion of the total number of subfiles may be sufficient to enable the nodes of the second group to decode the media file. Thus, service providers also may determine which of the above-described scaling techniques of FastReplica to utilize based on the content reliability requirements.

Figure 11A:
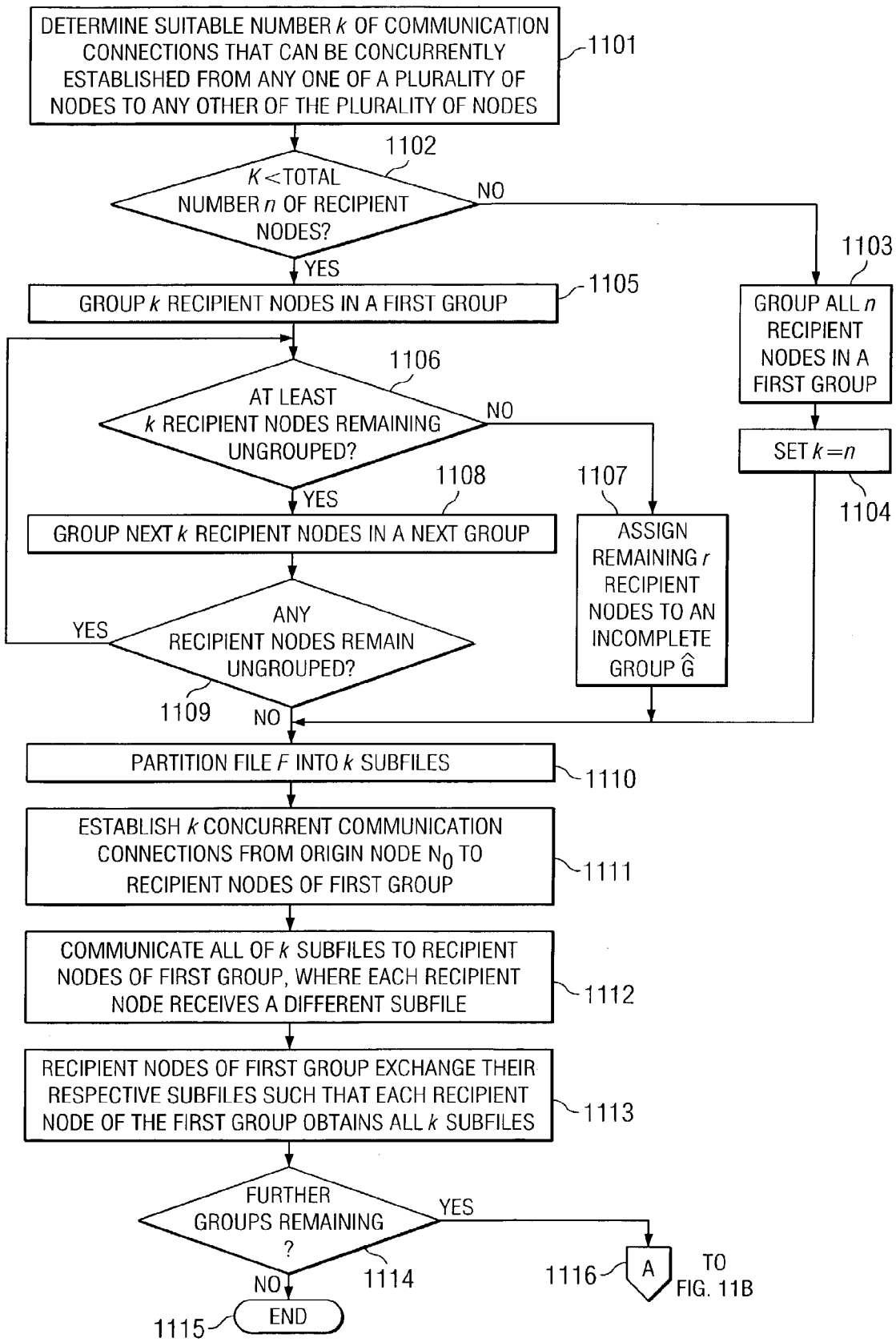

Finally, as mentioned briefly above, in certain implementations the first and second scaling techniques of FastReplica may be combined in a hybrid strategy to result in using an optimal size distribution tree. Turning to FIGS. 11A–11B, an example operational flow diagram for distributing a large file to a plurality of recipient nodes in a scalable fashion in accordance with an embodiment of the present invention is shown. As shown in FIG. 11A, operation of this example embodiment starts with operational block 1101, whereat a suitable number k of communication connections that can be concurrently established from any one of a plurality of nodes $N_1, N_2, \ldots, N_n$ to which a file F is to be distributed to any other of the plurality of nodes is determined. In operational block 1102 it is determined whether k is less than the total number n of recipient nodes to which file F is to be distributed. If k is not less than the total number n of recipient nodes, then operation advances to block 1103 whereat all n of the recipient nodes are grouped into a first group of nodes. Then, in operational block 1104, k is set equal to n. That is, the number of concurrent communication connections that is established from any one of the nodes during distribution is set to n. Operation then advances from block 1104 to operational block 1110, which is described further below.

If, at operational block 1102, it is determined that k is less than the total number n of recipient nodes, then operation advances to block 1105 whereat the first k number of recipient nodes $N_1, N_2, \ldots, N_n$ (i.e., nodes $N_1, N_2, \ldots, N_k$) are grouped into a first group of nodes. Then, in operational block 1106 it is determined whether at least k recipient nodes remain ungrouped. If there are fewer than k recipient nodes remaining to be grouped, then operation advances to block 1107 whereat the remaining r recipient nodes (r<k) are grouped to an incomplete group $\hat{G}$. Operation then advances from block 1107 to operational block 1110, which is described further below.

If, at operational block 1106, it is determined that at least k recipient nodes remain ungrouped, operation advances to block 1108 whereat the next k number of recipient nodes are grouped into a next group. Then, in operational block 1109, it is determined whether any recipient nodes remain ungrouped. If more recipient nodes do remain ungrouped, then operation returns to block 1106 to continue the logical grouping of the recipient nodes. If it is determined at operational block 1109 that no further recipient nodes remain ungrouped, then operation advances to block 1110.

At operational block 1110, file F is partitioned into k subfiles. In operational block 1111, origin node $N_0$ establishes k concurrent communication connections to the recipient nodes of the first group. Then, in operational block 1112, origin node $N_0$ communicates all of the k subfiles to the recipient nodes of the first group, wherein each recipient node receives a different subfile (as in the distribution step of the above-described FastReplica distribution technique). Then, in operational block 1113, the recipient nodes of the first group exchange their respective subfiles such that each recipient node of the first group obtains all k subfiles comprising file F (as in the collection step of the above-described FastReplica distribution technique).

In operational block 1114, it is determined whether further groups remain to have file F distributed thereto. If no such further groups remain, then operation ends in block 1115. However, if further groups do remain, then operation continues to FIG. 11B (as shown with linking block A 1116).

As shown in FIG. 11B, at operational block 1117 it is determined whether at least k complete groups remain to have file F distributed thereto. If not, then operation advances to block 1118. In block 1118, for each complete group remaining, a different node of the first group is assigned as an origin node to such complete group, wherein the assigned nodes of the first group each performs a one-to-many distribution to the recipient nodes of its assigned distribution group (and the nodes within each recipient group exchange their respective subfiles received from the nodes of the first group to obtain all of the subfiles comprising file F). In operational block 1119, it is determined whether an incomplete group $\hat{G}$ remains to have file F distributed thereto. If not, then operation ends in block 1121. If such an incomplete group $\hat{G}$ does remain, then operation advances to block 1120 whereat the nodes of the first group are then used to perform group-to-group distribution to the nodes of the incomplete group $\hat{G}$. Then, operation ends in block 1121.

If, at operational block 1117, it is determined that at least k complete groups do remain to have file F distributed thereto, then operation advances to block 1122. At block 1122, each node of the first group is assigned as an origin node to a different one of the remaining complete groups, wherein each node of the first group performs a one-to-many distribution to the recipient nodes of its assigned distribution group (and the nodes within each recipient group exchange their respective subfiles received from the nodes of the first group to obtain all of the subfiles comprising file F). Operation then advances to block 1123 whereat it is determined whether at least k×k complete groups remain to have file F distributed thereto. If not, then operation advances to block 1124. In block 1124, for each complete group remaining, a different node of the second-level groups is assigned as an origin node to such complete group, wherein the assigned nodes of the second-level groups each performs a one-to-many distribution to the recipient nodes of its assigned distribution group (and the nodes within each recipient group exchange their respective subfiles received from the nodes of the second-level groups to obtain all of the subfiles comprising file F). In operational block 1125, it is determined whether an incomplete group $\hat{G}$ remains to have file F distributed thereto. If not, then operation ends in block 1127. If such an incomplete group $\hat{G}$ does remain, then operation advances to block 1126 whereat the unassigned nodes of a complete second-level group are used to perform group-to-group distribution to the nodes of the incomplete group $\hat{G}$. For instance, as described above, such incomplete group $\hat{G}$ may be logically arranged from the shortest subtree (i.e., coupled to a group of the second-level that does not have a distribution group assigned thereto). Then, operation ends in block 1127.

If, at operational block 1123, it is determined that at least k×k complete groups do remain to have file F distributed thereto, then operation advances to block 1128. At block 1128, each node of each second-level group is assigned as an origin node to a different one of the remaining complete groups, wherein each node of each second-level group performs a one-to-many distribution to the recipient nodes of its assigned distribution group (and the nodes within each recipient group exchange their respective subfiles received from the nodes of the second-level groups to obtain all of the subfiles comprising file F). Operation then advances to block 1129 whereat it is determined whether at least k×k×k complete groups remain to have file F distributed thereto, and operation may continue in a manner similar to that described in blocks 1123–1128 until file F is distributed to all n of the nodes to which it is to be distributed.

In view of the above, the example of FIGS. 11A–11B provide an implementation of a scalable distribution technique that may use both group-to-group distribution (e.g., for incomplete groups) and one-to-many distribution. Of course, various other scalable distribution techniques may be utilized in accordance with the distribution techniques described herein, and any such scalable distribution techniques are intended to be within the scope of the present invention.

Various elements for performing the above-described file distribution functions of embodiments of the present invention may be implemented in software, hardware, firmware, or a combination thereof. For example, software may be used on an origin node $N_0$ for determining logical groupings of recipient nodes and/or for partitioning file F into the appropriate number of subfiles. As another example, network interfaces may be used to concurrently communicate subfiles from an origin node to recipient nodes of a distribution group (e.g., in the distribution step of FastReplica), as well as for communication of such subfiles between recipient nodes of the distribution group (e.g., in the collection step of FastReplica).

When implemented via computer-executable instructions, various elements of embodiments of the present invention for distributing file F from an origin node to recipient nodes are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

What is claimed is:

1. A method for transferring a file over a network comprising:
    logically organizing a plurality of recipient nodes to which a file F is to be distributed into a plurality of groups of recipient nodes, wherein each group comprises a plurality of said recipient nodes; and
    distributing said file F to the recipient nodes of said plurality of groups, wherein said distributing includes
    (a) partitioning said file F into a plurality of subfiles;
    (b) distributing the plurality of subfiles from a first node to a first group of recipient nodes, wherein at least one subfile is distributed from the first node to each recipient node of said first group but not all of said plurality of subfiles are distributed from the first node to any of the recipient nodes of said first group, and (c) said plurality of recipient nodes of said first group exchanging their respective subfiles such that each recipient node of said first group obtains all of said plurality of subfiles.

2. The method of claim 1 wherein said logically organizing said plurality of recipient nodes into a plurality of groups of recipient nodes comprises:
determining a number of recipient nodes to include in each of said plurality of groups.

3. The method of claim 2 wherein said determining a number of recipient nodes to include in each of said plurality of groups comprises:
determining a number k of concurrent communication connections that can be supported by any one of the nodes for concurrent communication with a plurality of the other nodes.

4. The method of claim 3 wherein said determining a number of recipient nodes to include in each of said plurality of groups comprises:
determining the number of recipient nodes to include in each of said plurality of groups as a function of the determined number k.

5. The method of claim 3 wherein said determining a number of recipient nodes to include in each of said plurality of groups comprises:
determining a number m of groups each having k recipient nodes, wherein $$m = \frac{n}{k}$$

with n being the total number of said plurality of recipient nodes to which said file F is to be distributed.

6. The method of claim 3 wherein said determining a number of recipient nodes to include in each of said plurality of groups comprises:
computing $$\frac{n}{k}$$

where n is the total number of said plurality of recipient nodes to which said file F is to be distributed, wherein if $$\frac{n}{k} = m + r$$

where r<k then logically arranging said n recipient nodes into m groups each comprising k recipient nodes and one group comprising r nodes.

7. The method of claim 6 wherein for each of said m groups distributing said file F thereto as follows:
distributing the plurality of subfiles to the recipient nodes of the group, wherein at least one subfile is distributed to each recipient node of the group but not all of said plurality of subfiles are distributed to any of the recipient nodes of the group; and
said recipient nodes of the group exchanging their respective subfiles such that each recipient node of the group obtains all of said plurality of subfiles.

8. The method of claim 6 wherein for said group comprising r nodes distributing said file F thereto as follows:
communicating a subfile from each node of one of the m groups to every recipient node the group comprising r nodes such that said r recipient nodes each receive all of said plurality of subfiles.

9. The method of claim 3 wherein said partitioning said file F comprises:
partitioning said file F into k subfiles.

10. The method of claim 1 wherein said distributing the plurality of subfiles from said first node to said first group of recipient nodes comprises:
distributing a different subfile to each of said recipient nodes of said first group.

11. The method of claim 1 wherein said distributing the plurality of subfiles from said first node to said first group of recipient nodes comprises:
distributing the plurality of subfiles to said plurality of recipient nodes of said first group concurrently.

12. The method of claim 1 wherein said plurality of recipient nodes of said first group exchanging their respective subfiles further comprises:
each of said plurality of recipient nodes establishing concurrent communication connections to every other recipient node of said first group.

13. The method of claim 1 wherein said distributing said file F to said recipient nodes of a plurality of groups further comprises:
distributing the plurality of subfiles from at least one node of said first group to the recipient nodes of a second group, wherein at least one subfile is distributed from the at least one node to each recipient node of said second group but not all of said plurality of subfiles are distributed from the at least one node to any of the recipient nodes of said second group; and
said recipient nodes of said second group exchanging their respective subfiles such that each recipient node of said second group obtains all of said plurality of subfiles.

14. The method of claim 13 wherein said distributing the plurality of subfiles from said at least one node of said first group to the recipient nodes of a second group comprises:
distributing the plurality of subfiles to said plurality of recipient nodes of said second group concurrently.

15. The method of claim 13 wherein said recipient nodes of said second group exchanging their respective subfiles further comprises:
each of said recipient nodes of said second group establishing concurrent communication connections to every other recipient node of said second group.

16. The method of claim 1 wherein said distributing the plurality of subfiles from said first node to said first group of recipient nodes comprises:
distributing the plurality of subfiles via a communication network to which said first node and said plurality of recipient nodes of said first group are communicatively coupled.

17. The method of claim 16 wherein said distributing the plurality of subfiles from said first node to said first group of recipient nodes comprises:
distributing the plurality of subfiles to said plurality of recipient nodes of said first group via concurrent communication connections of said first node to said communication network.

18. The method of claim 1 wherein said first node and said plurality of recipient nodes of said first group each comprise a server computer.

19. A system for transferring a file over a network comprising:
- means for logically organizing a plurality (n) of recipient nodes to which a file F is to be distributed into a plurality of groups of recipient nodes, wherein each group comprises a plurality of said recipient nodes;
- means for determining a number k of concurrent communication connections that can be supported by any one of the nodes for concurrent communication with a plurality of the other nodes;
- means for distributing said file F to the recipient nodes; and
- means for computing n/k, wherein if n/k=m then
  - (a) said organizing means logically organizes said n recipient nodes into m groups each comprising k recipient nodes, and
  - (b) said means for distributing said file F comprises means to distribute said file F to each of said m groups as follows:
    - (i) partitioning said file F into a plurality of subfiles,
    - (ii) distributing the plurality of subfiles from said origin node to a first group comprising a plurality of recipient nodes, wherein at least one subfile is distributed from the origin node to each recipient node of said first group but not all of said plurality of subfiles are distributed from the origin node to any of the recipient nodes of said first group, and
    - (iii) said recipient nodes of said first group each comprising means for exchanging their respective subfiles received from said origin node such that each recipient node of said first group obtains all of said plurality of subfiles.

20. The system of claim 19 wherein if $$\frac{n}{k} = m + r$$

where r<k then said organizing means logically organizes said n recipient nodes into m groups each comprising k recipient nodes and one group comprising r nodes.

21. The system of claim 20 wherein for said group comprising r nodes, said means for distributing said file F to said plurality of recipient nodes comprises means for distributing said file F to said group comprising r nodes as follows:
- communicating a subfile from each node of one of the m groups to every recipient node the group comprising r nodes such that said r recipient nodes each receive all of said plurality of subfiles.

22. The system of claim 19 wherein said means for distributing said file F to each of said m groups comprises means for distributing a different one of said plurality of subfiles to each of the recipient nodes of a group.

23. The system of claim 19 wherein said means for distributing said file F to each of said m groups comprises means for communicating said plurality of subfiles to all of the recipient nodes of a group concurrently.

24. The system of claim 19 wherein said recipient nodes of the group exchanging their respective subfiles comprises said recipient nodes of the group exchanging their respective subfiles concurrently.

25. The system of claim 19 wherein said recipient nodes of the group exchanging their respective subfiles comprises a recipient node of the group communicating its respective subfile to all other recipient nodes of the group concurrently.

26. A system for transferring a file over a network comprising:
- an origin node comprising a file F;
- a plurality of recipient nodes to which said file F is to be distributed, wherein the plurality of recipient nodes are logically organized into a plurality of groups, each group comprising a plurality of said recipient nodes;
- said origin node operable to partition said file F into a plurality of subfiles, and said origin node operable to distribute all of said plurality of subfiles to recipient nodes of a first group, wherein at least one subfile is distributed from the origin node to each recipient node of said first group but not all of said plurality of subfiles are distributed from the origin node to any of the recipient nodes of said first group;
- said recipient nodes of said first group operable to exchange their respective subfiles received from said origin node such that each recipient node of said first group obtains all of said plurality of subfiles;
- at least one of said recipient nodes of said first group operable to distribute all of said plurality of subfiles to recipient nodes of a second group, wherein at least one subfile is distributed from the at least one node to each recipient node of said second group but not all of said plurality of subfiles are distributed from the at least one node to any of the recipient nodes of said second group; and
- said recipient nodes of said second group operable to exchange their respective subfiles received from said at least one node such that each recipient node of said second group obtains all of said plurality of subfiles.

27. The system of claim 26 wherein said origin node is operable to distribute a different one of said plurality of subfiles to each of the recipient nodes of said first group.

28. The system of claim 27 wherein said origin node is operable to communicate said plurality of subfiles to all of the recipient nodes of said first group concurrently.

29. The system of claim 28 wherein each of said recipient nodes of said first group is operable to communicate its respective subfile received from said origin node to all other recipient nodes of the first group concurrently.

30. A method for transferring a file over a network comprising:
- logically organizing a plurality of recipient nodes to which a file F is to be distributed into a plurality of groups of recipient nodes, wherein each group comprises a plurality of said recipient nodes;
- distributing said file F to the recipient nodes of said plurality of groups, wherein said distributing includes
  - (a) partitioning said file F into a plurality of subfiles,
  - (b) distributing the plurality of subfiles from a first node to a first group of recipient nodes, wherein at least one subfile is distributed from the first node to each recipient node of said first group but not all of said plurality of subfiles are distributed from the first node to any of the recipient nodes of said first group,
  - (c) said plurality of recipient nodes of said first group exchanging their respective subfiles such that each recipient node of said first group obtains all of said plurality of subfiles, and
  - (d) distributing said file F from said first group to at least one other group of recipient nodes.

31. The method of claim 30 wherein said logically organizing said plurality of recipient nodes into a plurality of groups of recipient nodes comprises:

determining a number of recipient nodes to include in each of said plurality of groups.

32. The method of claim 31 wherein said determining a number of recipient nodes to include in each of said plurality of groups comprises:

determining a number k of concurrent communication connections that can be supported by any one of the nodes for concurrent communication with a plurality of the other nodes.

33. The method of claim 32 wherein said determining a number of recipient nodes to include in each of said plurality of groups comprises:

determining the number of recipient nodes to include in each of said plurality of groups as a function of the determined number k.

34. The method of claim 32 wherein said partitioning said file F comprises:

partitioning said file F into k subfiles.

35. The method of claim 30 wherein said distributing the plurality of subfiles from said first node to said first group of recipient nodes comprises:

distributing a different subfile to each of said recipient nodes of said first group.

36. The method of claim 35 wherein said distributing the plurality of subfiles from said first node to said first group of recipient nodes comprises:

distributing the plurality of subfiles to said plurality of recipient nodes of said first group concurrently.

37. The method of claim 30 wherein said plurality of recipient nodes of said first group exchanging their respective subfiles further comprises:

each of said plurality of recipient nodes establishing concurrent communication connections to every other recipient node of said first group.

38. The method of claim 30 wherein said distributing said file F from said first group to at least one other group of recipient nodes comprises:

distributing the plurality of subfiles from a first node of said first group to a second group of recipient nodes, wherein at least one subfile is distributed from the first node of said first group to each recipient node of said second group but not all of said plurality of subfiles are distributed from the first node of said first group to any of the recipient nodes of said second group; and said plurality of recipient nodes of said second group exchanging their respective subfiles such that each recipient node of said second group obtains all of said plurality of subfiles.

39. The method of claim 38 wherein said distributing the plurality of subfiles from said at least one node of said first group to the recipient nodes of said second group comprises:

distributing the plurality of subfiles to said plurality of recipient nodes of said second group concurrently.

40. The method of claim 38 wherein said recipient nodes of said second group exchanging their respective subfiles further comprises:

each of said recipient nodes of said second group establishing concurrent communication connections to every other recipient node of said second group.

* * * * *